(12) United States Patent
Kim et al.

(10) Patent No.: US 9,727,192 B2
(45) Date of Patent: Aug. 8, 2017

(54) TOUCH DISPLAY DEVICE AND DRIVING METHOD THEREOF

(71) Applicant: Samsung Display Co., Ltd., Yongin (KR)

(72) Inventors: Hyun-Sik Kim, Hwaseong-si (KR); Jun-Young Ko, Seoul (KR); Kwan Young Han, Seongnam-si (KR)

(73) Assignee: Seoul Viosys Co., Ltd., Ansan-si (KR)

( * ) Notice: Subject to any disclaimer, the term of this patent is extended or adjusted under 35 U.S.C. 154(b) by 0 days.

(21) Appl. No.: 14/801,465

(22) Filed: Jul. 16, 2015

(65) Prior Publication Data

US 2016/0216798 A1 Jul. 28, 2016

(30) Foreign Application Priority Data

Jan. 27, 2015 (KR) .......................... 10-2015-0013044

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ........... G06F 2203/04107; G06F 3/044; G06F 3/0416; G06F 3/0412
USPC ................................................ 345/173, 174
See application file for complete search history.

(56) References Cited

U.S. PATENT DOCUMENTS

| | | | |
|---|---|---|---|
| 7,262,609 B2 | 8/2007 | Reynolds | |
| 8,542,215 B2 | 9/2013 | Hanauer et al. | |
| 8,970,529 B2 | 3/2015 | Kim et al. | |
| 2007/0074913 A1* | 4/2007 | Geaghan | G06F 3/044 178/18.06 |

(Continued)

FOREIGN PATENT DOCUMENTS

| | | |
|---|---|---|
| JP | 5127572 | 1/2013 |
| KR | 10-0601151 | 7/2006 |

(Continued)

OTHER PUBLICATIONS

Tong-Hun Hwang, et al., "A Highly Area-Efficient Controller for Capacitive Touch Screen Panel Systems," IEEE Transactions on Consumer Electronics, vol. 56, Issue 2, pp. 1115-1122, May 2010.

(Continued)

*Primary Examiner* — Koosha Sharifi-Tafreshi
(74) *Attorney, Agent, or Firm* — H.C. Park & Associates, PLC (57) ABSTRACT

A touch display device including: a plurality of first sensing electrodes; a plurality of second sensing electrodes forming a mutual capacitance with the plurality of first sensing electrodes; an oscillation circuit connected with the plurality of second sensing electrodes and supplying energy so as to generate a first sinusoidal wave signal; a first electrode plate forming a parasitic capacitance with the first and second sensing electrodes and receiving a second sinusoidal wave signal corresponding to the first sinusoidal wave signal; and a scanning driver configured to sequentially select the plurality of first sensing electrodes one-by-one, apply a reference voltage to the selected first sensing electrode, and float the first sensing electrodes which are not selected.

16 Claims, 9 Drawing Sheets

(56) References Cited

U.S. PATENT DOCUMENTS

| | | | | |
|---|---|---|---|---|
| 2011/0267310 A1* | 11/2011 | Tsukahara | ............. | G06F 3/0416 |
| | | | | 345/174 |
| 2011/0285661 A1* | 11/2011 | Hotelling | .............. | G06F 3/0418 |
| | | | | 345/174 |
| 2013/0044067 A1 | 2/2013 | Chu et al. | | |
| 2013/0093721 A1* | 4/2013 | Nakamura | .............. | G06F 3/044 |
| | | | | 345/174 |
| 2013/0285971 A1* | 10/2013 | Elias | ....................... | G06F 3/044 |
| | | | | 345/174 |
| 2014/0028612 A1 | 1/2014 | Ahn et al. | | |
| 2014/0062934 A1* | 3/2014 | Coulson | .................. | G06F 3/044 |
| | | | | 345/174 |
| 2015/0205406 A1* | 7/2015 | Zhou | ..................... | G06F 3/0412 |
| | | | | 345/174 |
| 2016/0054853 A1* | 2/2016 | Hu | ........................ | G06F 3/0412 |
| | | | | 345/174 |

FOREIGN PATENT DOCUMENTS

| | | |
|---|---|---|
| KR | 10-2008-0027242 | 3/2008 |
| KR | 10-2013-0071518 | 7/2013 |
| KR | 10-2013-0075717 | 7/2013 |
| KR | 10-2013-0120134 | 11/2013 |
| KR | 10-2014-0072586 | 6/2014 |
| KR | 10-1421464 | 7/2014 |

OTHER PUBLICATIONS

Ik-Seok Yang, et al., "A Touch Controller Using Differential Sensing Method for On-Cell Capacitive Touch Screen Panel Systems," IEEE Transactions on Consumer Electronics, vol. 57, Issue 3, pp. 1027-1032, Aug. 2011.

* cited by examiner

TOUCH DISPLAY DEVICE AND DRIVING METHOD THEREOF

CROSS-REFERENCE TO RELATED APPLICATION

This application claims priority from and the benefit of Korean Patent Application No. 10-2015-0013044, filed on Jan. 27, 2015, which is hereby incorporated by reference for all purposes as if fully set forth herein.

BACKGROUND

Field

Exemplary embodiments relate to a touch display device and a driving method thereof, and more particularly, to a frequency sensing type touch display device.

Discussion of the Background

A touch display device may be manufactured by assembling a separate touch screen panel and a display panel, and may also be manufactured by an on-cell or in-cell method when sensing electrodes are integrally formed in the display panel.

Further, a capacitive touch display device may be configured by a self-capacitive type, a mutual-capacitive type divided into a Tx electrode and an Rx electrode, and the like according to a configuration and a driving method of a sensing electrode.

In the mutual-capacitive type touch display device, a touch driving signal is supplied to the Tx electrode, and the existence of a user's touch is determined according to a voltage received from the Rx electrode.

However, as the thickness of the touch display device has gradually decreased over time, the Tx and Rx electrodes tend to form a parasitic capacitance with an electrode plate of the display panel formed at the bottom.

As a result of this parasitic capacitance, the sensing electrode is exposed to display noise while driving the display and thus, there is a problem in that the user's touch becomes difficult to accurately sense.

Further, even when the display is not driven, charges generated in the mutual capacitance are discharged in a formation direction of the parasitic capacitance. Thus, a touch sensing signal amount is reduced, and as a result, there is a problem in that a signal-to-noise ratio (SNR) is decreased.

Accordingly, a touch display device is needed that minimizes any undesirable effects caused by the parasitic capacitance.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch display device and a driving method thereof having advantages of acquiring a high signal-to-noise ratio and implementing a thin touch display device by minimizing an effect of a parasitic capacitance and removing a noise component.

Additional aspects will be set forth in the detailed description which follows, and, in part, will be apparent from the disclosure, or may be learned by practice of the inventive concept.

An exemplary embodiment discloses a touch display device including: a plurality of first sensing electrodes; a plurality of second sensing electrodes forming a mutual capacitance with the plurality of first sensing electrodes; an oscillation circuit connected with the plurality of second sensing electrodes and supplying energy so as to generate a first sinusoidal wave signal; a first electrode plate forming a parasitic capacitance with the first and second sensing electrodes and receiving a second sinusoidal wave signal corresponding to the first sinusoidal wave signal; and a scanning driver configured to sequentially select the plurality of first sensing electrodes, apply a reference voltage to the selected first sensing electrode, and float the first sensing electrodes which are not selected.

An exemplary embodiment also discloses a method for driving a touch display device including: selecting one of a plurality of first sensing electrodes and applying a reference voltage to the selected first sensing electrode by a scanning driver; electrically connecting a second sensing electrode forming a mutual capacitance with the selected first sensing electrode and an oscillation circuit; exchanging energy between an inductance element of the oscillation circuit and the mutual capacitance and generating a first sinusoidal wave signal determining a frequency according to whether a user's touch exists; supplying a second sinusoidal wave signal corresponding to the first sinusoidal wave signal to a first electrode plate forming a parasitic capacitance with the first and second sensing electrodes; and determining whether a touch state of the user exists by analyzing a frequency of the first sinusoidal wave signal.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
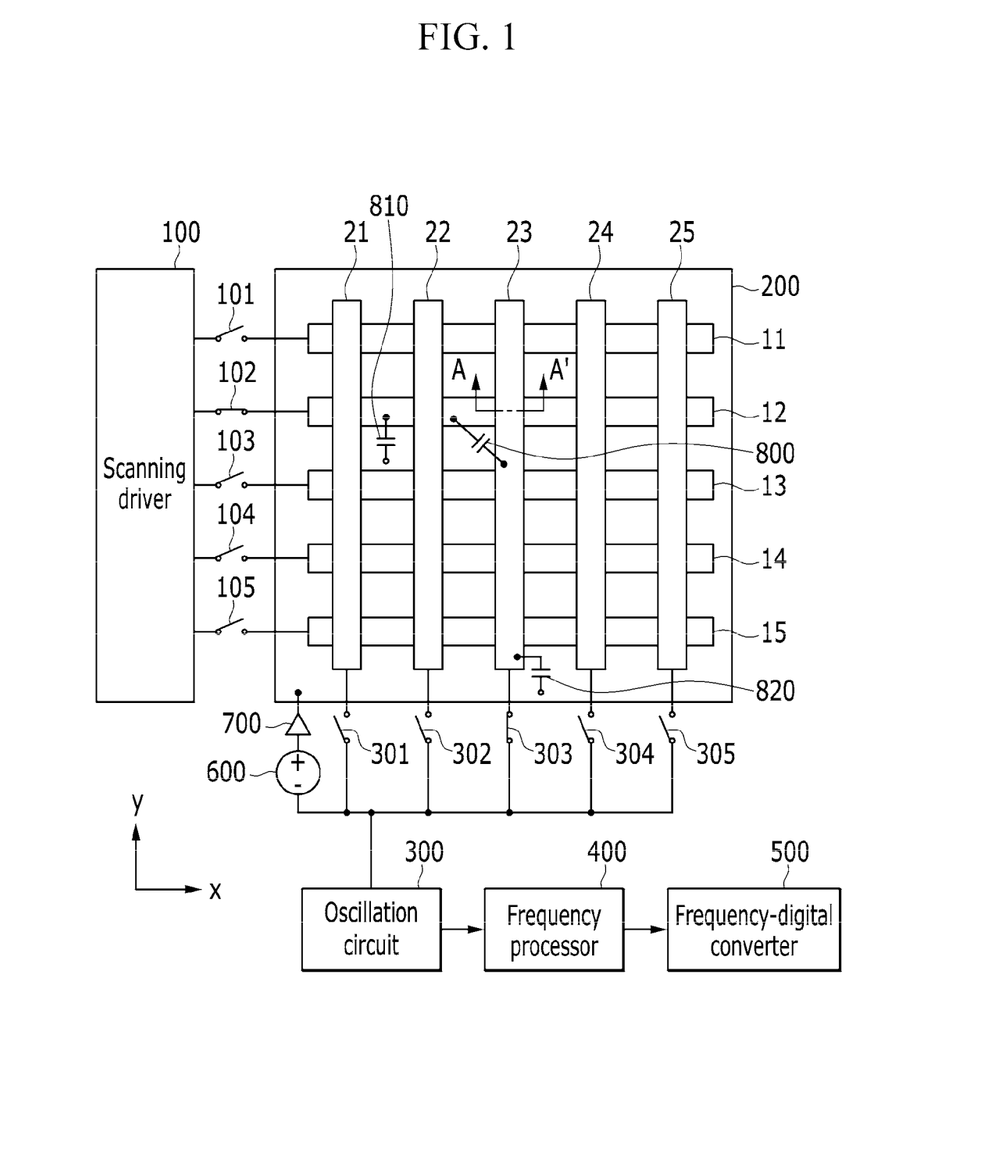
FIG. 1 is a diagram illustrating a part of a touch display device according to an exemplary embodiment of the present invention.

FIG. 1 is a diagram illustrating a part of a touch display device according to an exemplary embodiment of the present invention.

Referring to FIG. 1, the touch display device according to an exemplary embodiment of the present invention includes a scanning driver 100, a first electrode plate 200, a plurality of first sensing electrodes 11, 12, 13, 14, and 15, a plurality of second sensing electrodes 21, 22, 23, 24, and 25, an oscillation circuit 300, a frequency processor 400, and a frequency-digital converter 500.

The first sensing electrodes 11, 12, 13, 14, and 15 and the second sensing electrodes 21, 22, 23, 24, and 25 may be made of transparent conductive materials, such as indium tin oxide (ITO).

The first sensing electrodes 11, 12, 13, 14, and 15 may be formed in a horizontal direction x, and the second sensing electrodes 21, 22, 23, 24, and 25 may be formed in a vertical direction y.

In FIG. 1, the first sensing electrodes 11, 12, 13, 14, and 15 and the second sensing electrodes 21, 22, 23, 24, and 25 are illustrated as having bar shapes for describing an electrical connection relationship, and cross each other in a form connecting diamond shapes to be formed on the same layer.

In FIG. 1, the number of first sensing electrodes 11, 12, 13, 14, and 15, and the number of second sensing electrodes 21, 22, 23, 24, and 25 are illustrated as five, respectively, but the number of sensing electrodes may vary according to a size, accuracy, specifications, and the like of the touch panel.

The first sensing electrodes 11, 12, 13, 14, and 15 and the second sensing electrodes 21, 22, 23, 24, and 25 form mutual capacitances 800 by interposing a dielectric material therebetween. FIG. 1 illustrates the mutual capacitance 800 between the selected first sensing electrode 12 and second sensing electrode 23, but all of the first sensing electrodes 11, 12, 13, 14, and 15 and the second sensing electrodes 21, 22, 23, 24, and 25 form the mutual capacitances therebetween.

The first sensing electrodes 11, 12, 13, 14, and 15 and the second sensing electrodes 21, 22, 23, 24, and 25 form parasitic capacitances with the first electrode plate 200, respectively.

In FIG. 1, the selected first sensing electrode 12 forms a parasitic capacitance 810 with the first electrode plate 200, and the selected second sensing electrode 23 forms a parasitic capacitance 820 with the first electrode plate 200.

The scanning driver 100 includes a plurality of switching elements 101, 102, 103, 104, and 105, and the switching elements 101, 102, 103, 104, and 105 are connected to corresponding one end of each of the first sensing electrodes 11, 12, 13, 14, and 15. The switching elements 101, 102, 103, 104, and 105 may each be configured as a semiconductor switching element, a mechanical switching element, and the like.

The scanning driver 100 sequentially selects the first sensing electrodes 11, 12, 13, 14, and 15 through the switching elements 101, 102, 103, 104, and 105, and performs first scanning of turning on a switching element 102 corresponding to the selected first sensing electrode 12.

The scanning driver 100 turns off the switching elements 101, 103, 104, and 105 corresponding to the first sensing electrodes 11, 13, 14, and 15 which are not selected. Accordingly, the first sensing electrodes 11, 13, 14, and 15 are in a floating state.

When the switching element 102 is turned on, a reference voltage is applied to the first sensing electrode 12 which is electrically connected with the scanning driver 100. In this case, the reference voltage is a ground voltage GND, and there is a merit that the scanning driver 100 may not include a separate power supply source.

The oscillation circuit 300 is connected with one end of each of the second sensing electrodes 21, 22, 23, 24, and 25 through a plurality of switching elements 301, 302, 303, 304, and 305. The switching elements 301, 302, 303, 304, and 305 may be configured as a semiconductor switching element, a mechanical switching element, and the like. Although not illustrated, a multiplexer signal controller controlling the switching elements 301, 302, 303, 304, and 305 may be separately included. The multiplexer signal controller and the switching elements 301, 302, 303, 304, and 305 may collectively be called a "switching unit".

When one first sensing electrode 12 is selected by the scanning driver 100, the switching elements 301, 302, 303, 304, and 305 are sequentially selected one-by-one to be turned on. As a result, second scanning for all of the second sensing electrodes 21, 22, 23, 24, and 25 connected to the selected first sensing electrode 12 is performed.

The second scanning is required when only one oscillation circuit 300 is provided, but may not be required when a plurality of oscillation circuits corresponding to the second sensing electrodes 21, 22, 23, 24, and 25 is provided. In this case, the switching elements 301, 302, 303, 304, and 305 may not be required.

The oscillation circuit 300 supplies energy so as to generate a first sinusoidal wave signal in the electrically connected second sensing electrode 23. This will be described in detail in FIG. 2.

The first electrode plate 200 may be made of a transparent conductive material such as ITO, or the like. Whether the first electrode plate 200 configures any part of the touch display device may vary according to a type and a manufacturer of the touch display device. In the present invention, in FIGS. 6A, 6B, 7A, and 7B, a case where the first electrode plate 200 is a cathode of an organic light emitting element, a case where the first electrode plate 200 is a common electrode of the liquid crystal display, and the like are exemplified in detail.

A second sinusoidal wave signal corresponding to the first sinusoidal wave signal is applied to the first electrode plate 200. The second sinusoidal wave signal may be substantially the same (a frequency, an amplitude, a phase, and the like) as the first sinusoidal wave signal.

The second sinusoidal wave signal may be supplied when the first electrode plate 200 is electrically connected with the oscillation circuit 300. In this case, a buffer 700 may be electrically interposed between the first electrode plate 200 and the oscillation circuit 300.

The buffer 700, which may be configured as a signal follower, transfers the first sinusoidal wave signal generated in the oscillation circuit 300 to the first electrode plate 200.

A voltage source 600 supplies a predetermined voltage to the first electrode plate 200. When the first electrode plate 200 is the cathode of the organic light emitting element, the predetermined voltage may be an ELVSS voltage (a second power supply voltage). When the first electrode plate 200 is the common electrode of the liquid crystal display, the predetermined voltage may be a common voltage. A supply voltage may be a predetermined DC voltage.

The aforementioned predetermined voltage overlaps with the second sinusoidal wave signal to be supplied to the first electrode plate 200.

The voltage source 600 may overlap with the second sinusoidal wave signal to supply the predetermined voltage to the first electrode plate 200, but the voltage source 600 is not necessarily disposed at a position illustrated in FIG. 1.

The ELVSS or the common voltage, which may be a DC voltage, may be supplied to the first electrode plate 200 through an electrical path other than the voltage source 600.

The frequency processor 400 receives from the oscillation circuit 300 the first sinusoidal wave signal including a touch frequency component according to a user's touch, and outputs a third sinusoidal wave signal by filtering noise. A detailed configuration and an operation of the frequency processor 400 will be described in FIG. 4.

The frequency-digital converter (FDC) 500 receives the third sinusoidal wave signal and outputs a digital signal corresponding to a frequency of the third sinusoidal wave signal. The FDC 500 derives a frequency by counting how many times the third sinusoidal wave signal is oscillated based on a predetermined voltage to convert the corresponding digital signal.

Although not illustrated, a digital signal processor (DSP) processing the digital signal may be further included.

When the frequency of the third sinusoidal wave signal is defined as a reference frequency when there is no touch state of the user, if a difference between the frequency of the third sinusoidal wave signal and the reference frequency is greater than or equal to a first threshold and less than a second threshold value, a hovering state is determined.

Further, when the difference between the frequency of the third sinusoidal wave signal and the reference frequency is the second threshold value or more, it is determined that a touch state of a user exists.

That is, the hovering and the touch may be divided by determining the difference between the reference frequency and the frequency of the third sinusoidal wave signal. In this case, the difference value is determined as the size, regardless of a negative number and a positive number, by taking an absolute value.

Figure 4:
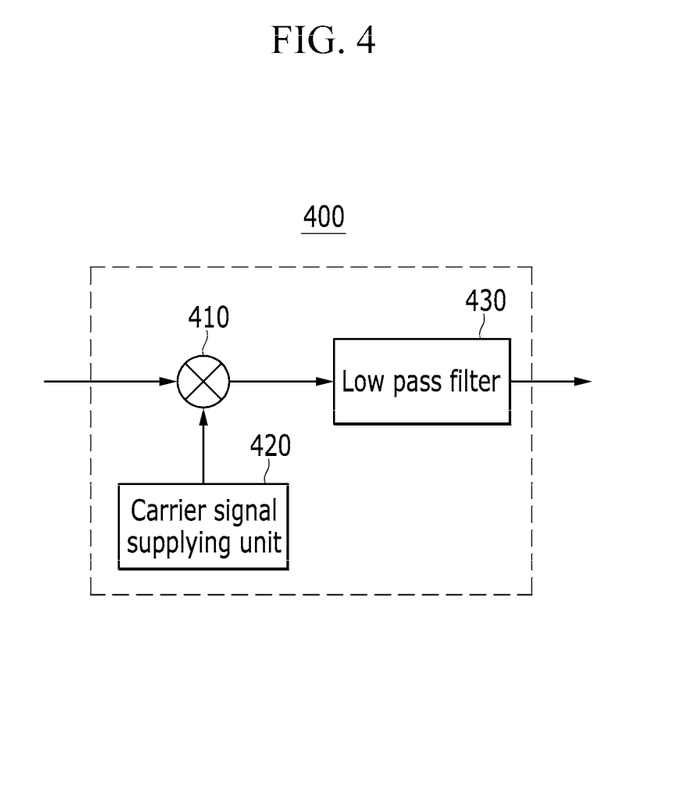
FIG. 4 is a diagram illustrating a frequency processor according to an exemplary embodiment of the present invention.

The frequency of the third sinusoidal wave signal may be higher than or lower than the reference frequency. This may be determined according to whether a frequency of a frequency mixer 410 is designed to be higher than or lower than the frequency of the first sinusoidal wave signal.

The difference between the frequency of the third sinusoidal wave signal detected in the hovering state and the reference frequency is smaller than a difference between the frequency of the third sinusoidal wave signal when the touch is performed and the reference frequency.

Figure 2:
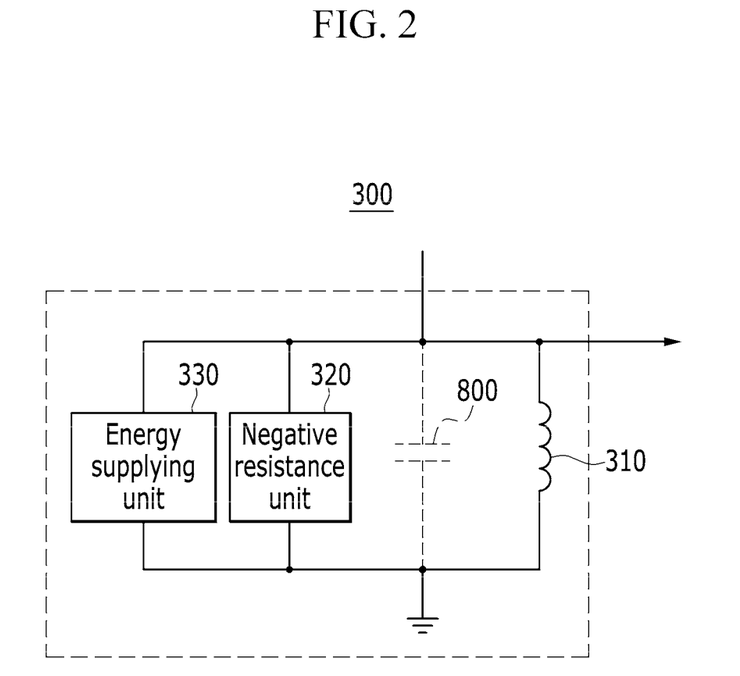
FIG. 2 is a diagram illustrating an oscillation circuit according to an exemplary embodiment of the present invention.

FIG. 2 is a diagram illustrating an oscillation circuit according to an exemplary embodiment of the present invention.

Referring to FIG. 2, the oscillation circuit 300 according to an exemplary embodiment of the present invention is constituted by an LC oscillation circuit. The oscillation circuit 300 includes an inductance element 310 and an energy supplying unit 330.

The mutual capacitance 800 is not an element which is physically provided in the oscillation circuit 300, and is illustrated as a dotted line in order to describe that the inductance element 310 and the mutual capacitance 800 are electrically disposed in parallel in LC oscillation of the oscillation circuit 300. This will be described in more detail in FIG. 3.

The energy supplying unit 330 includes a power supply source for generating resonance between the mutual capacitance 800 and the inductance element 310. Since the energy is reduced over time by a resistance component existing in a wire, an element, and the like, the energy supplying unit 330 supplies the needed energy.

The oscillation circuit 300 may further include a negative resistance unit 320. The negative resistance unit 320 may be implemented as an active circuit, and a resistance value may be controlled so as to offset a parasitic resistance component of the selected second sensing electrode 23. Accordingly, oscillation may be performed only by an L value of the inductance element 310 in which the resistance component is removed and a C value of the mutual capacitance 800.

Figure 3:
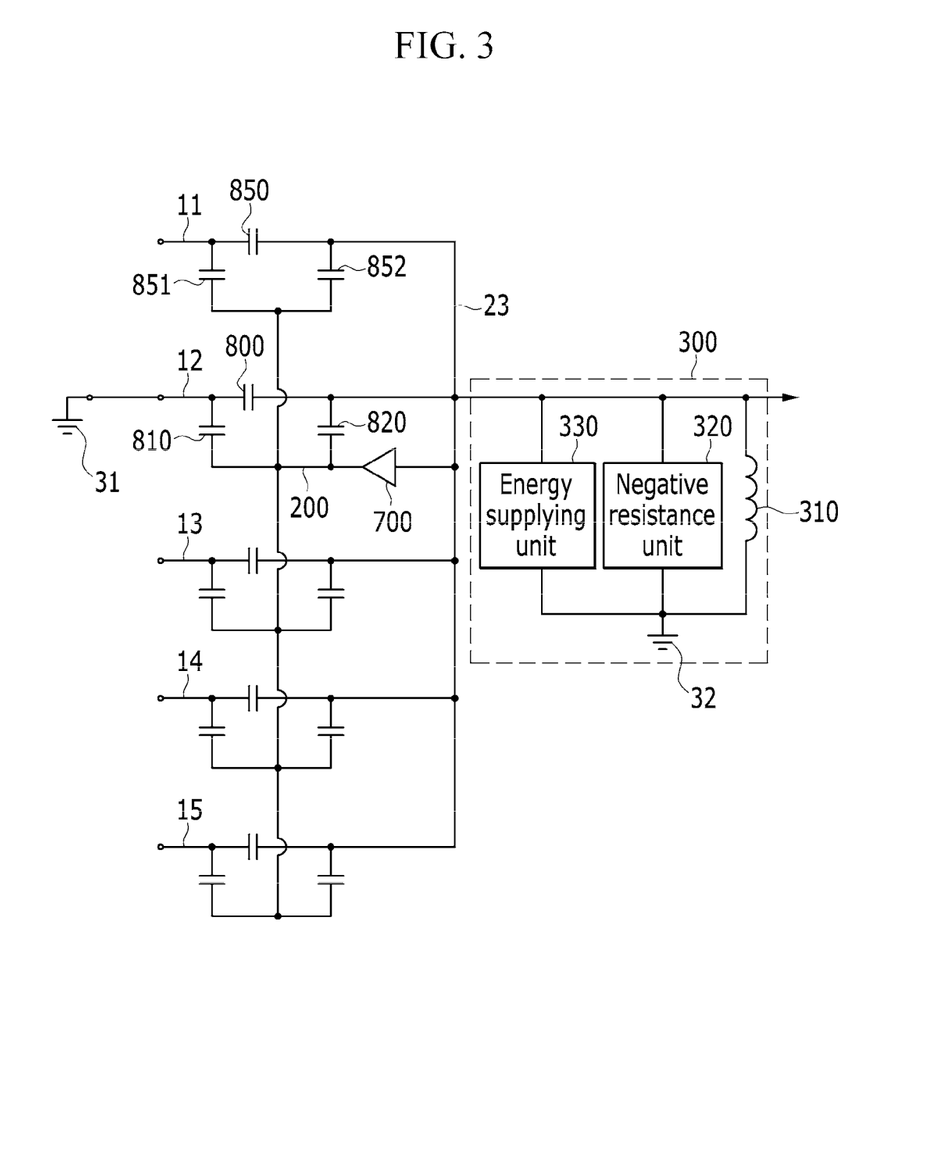
FIG. 3 is a circuit diagram for describing an operation of the touch display device of FIG. 1.

FIG. 3 is a circuit diagram for describing an operation of the touch display device of FIG. 1.

FIG. 3, similar to FIG. 1, illustrates that the first sensing electrode 12 is selected, and while the second scanning is performed, the second sensing electrode 23 is selected to be electrically connected with the oscillation circuit 300.

In FIG. 3, it is assumed that all of the first sensing electrodes 11, 12, 13, 14, and 15 and the second sensing electrodes 21, 22, 23, 24, and 25 form the parasitic capacitances with the first electrode plate 200, and how the parasitic capacitance may be ignored will be described below.

In the first sensing electrode 11, which is not selected in the first scanning, the parasitic capacitances 851 and 852 and the mutual capacitance 850 may be depicted as one capacitance element connected in series-parallel.

The first electrode plate 200 is electrically connected to one end of one capacitance element, and the second sinusoidal wave signal is applied to the first electrode plate 200 through the buffer 700.

The second sensing electrode 23 selected in the second scanning is electrically connected to the other end of one capacitance element to be in a state where the first sinusoidal wave signal is applied.

The first sinusoidal wave signal and the second sinusoidal wave signal are substantially the same signal, and since the same signal as a voltage is applied to both ends of one capacitance element, one capacitance element may be electrically ignored regardless of how large the capacitance is.

Since the principle is equally applied even to other first sensing electrodes 13, 14, and 15, which are not selected in the first scanning, the parasitic capacitance and the mutual capacitance may be ignored.

The selected first sensing electrode 12 is connected to the reference voltage 31 through the scanning driver 100 (not shown in FIG. 3). Accordingly, one end of the mutual capacitance 800 is fixed as the reference voltage 31 so as not to be influenced by the parasitic capacitance 810. The second sinusoidal wave signal is applied to one end of the parasitic capacitance 820 and the first sinusoidal wave signal is applied to the other end, and as a result, the parasitic capacitance 820 may also be ignored through the aforementioned principle.

As a result, the mutual capacitance 800 formed between the selected first sensing electrode 12 and second sensing electrode 23 is not influenced by the parasitic capacitances 810 and 820.

The same reference voltages 31 and 32, such as a ground voltage, are applied to one end of the mutual capacitance 800 and one end of the inductance element 310, and the other end of the mutual capacitance 800 and the other end of the inductance element 310 are electrically connected with each other in the same node.

Accordingly, the mutual capacitance 800 of the selected first and second sensing electrodes 12 and 23 and the inductance element 310 are electrically configured in parallel.

As the mutual capacitance 800 and the inductance element 310 exchange the energy received from the energy supplying unit 330, the first sinusoidal wave signal oscillated at the predetermined frequency is generated.

In this case, the frequency of the first sinusoidal wave signal may be varied according to a touch state of the user or hovering.

FIG. 4 is a diagram illustrating a frequency processing unit according to an exemplary embodiment of the present invention.

Referring to FIG. 4, the frequency processor 400 includes a frequency mixer 410, a carrier signal supplying unit 420, and a low pass filter (LPF) 430.

The carrier signal supplying unit 420 supplies a carrier signal having a carrier frequency to the frequency mixer 410.

The frequency mixer 410 frequency-mixes the first sinusoidal wave signal with the received carrier signal.

The first sinusoidal wave signal includes a signal component and a noise component having different frequencies. The frequency of the signal component may be increased by controlling the inductance element 310 and the mutual capacitance 800. The frequency of the signal component may be designed as a high-frequency band avoiding a frequency band in which noises are mainly positioned.

The frequency mixer 410 frequency down-converts the signal component which is a high frequency based on the carrier signal into a low frequency signal which may pass through the low pass filter 430. On the contrary, the frequency mixer 410 frequency up-converts the noise component, which is typically a low frequency, into a high-frequency signal which may not pass through the low pass filter 430.

Accordingly, the signal output from the low pass filter 430 is the third sinusoidal wave signal, in which the noise component is removed, and the signal component is concentrated in the low-frequency band.

The third sinusoidal wave signal is processed by the aforementioned FDC 500 and thus, whether a touch state of the user may be determined.

As a result, according to an exemplary embodiment of the present invention, even though a thin touch display device having a small distance between the sensing electrodes 11, 12, 13, 14, 15, 21, 22, 23, 24, and 25 and the first electrode plate 200 is manufactured, the effect of the parasitic capacitance is minimized, the noise component is removed, and as a result, the touch display device having a high SNR may be implemented.

Figure 5:
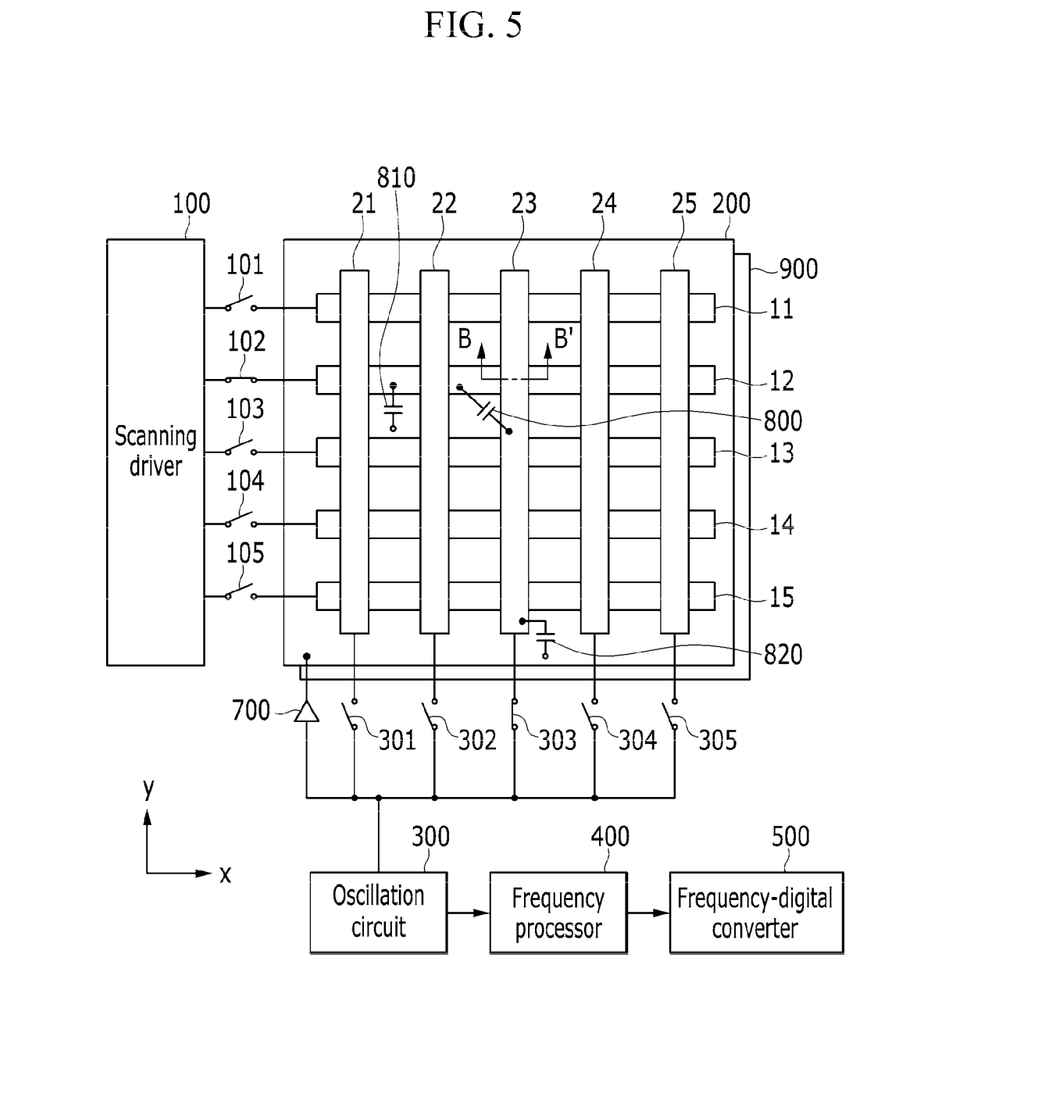
FIG. 5 is a diagram illustrating a part of a touch display device according to another exemplary embodiment of the present invention.

FIG. 5 is a diagram illustrating a part of a touch display device according to another exemplary embodiment of the present invention.

Referring to FIG. 5, a second electrode plate 900 is disposed to interpose the first electrode plate 200 between the first and second sensing electrodes 11, 12, 13, 14, 15, 21, 22, 23, 24, and 25. That is, the second electrode plate 900 is disposed below the first electrode plate 200.

The second electrode plate 900 may be a cathode of the organic light emitting element or a common electrode contacting one surface of the liquid crystal layer. A voltage required for displaying, such as an ELVSS voltage, may be supplied to the second electrode plate 900.

According to the exemplary embodiment of FIG. 5, since an output of the buffer 700 to which the second sinusoidal wave signal is supplied is connected to only the first electrode plate 200, the second electrode plate 900 may perform a display function regardless of the second sinusoidal wave signal. This will be described in detail in FIGS. 6B and 7B.

Since the first electrode plate 200 is used for removing the parasitic capacitances 810 and 820, an electrical configuration of the voltage source 600 in FIG. 1 is excluded.

The first electrode plate 200 and the second electrode plate 900 may be made of a transparent conductive material, such as ITO.

Figure 6A:
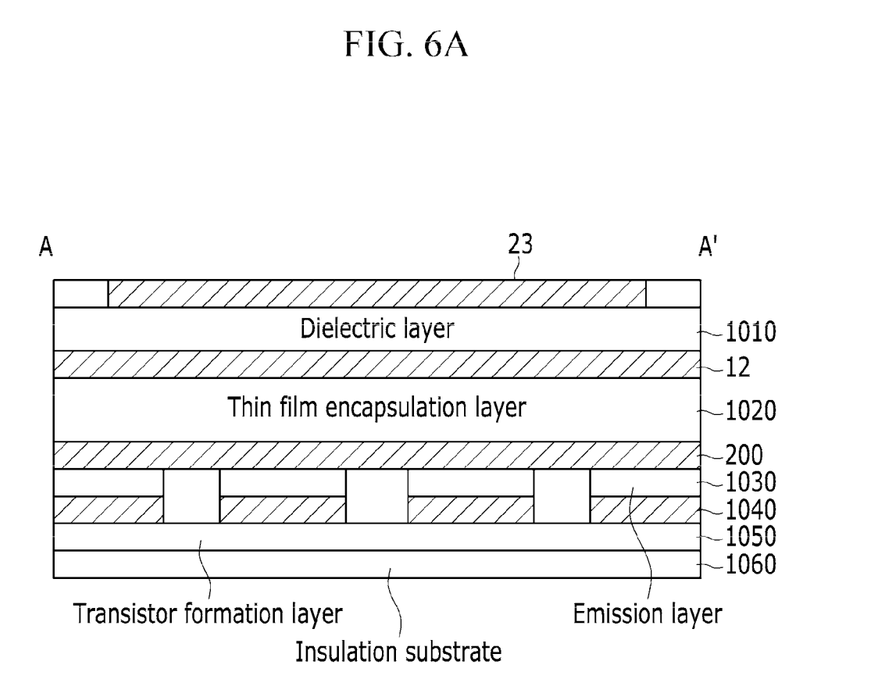
FIG. 6A and FIG. 6B are cross-sectional views illustrating an exemplary embodiment when the touch display device of the present invention is an organic light emitting diode display.

FIG. 6A is a cross-sectional view of FIG. 1 taken along line A-A' when the touch display device is an organic light emitting diode display.

An insulation substrate 1060 may be made of plastic such as glass or polyimide.

A transistor formation layer 1050 is disposed on the insulation substrate 1060. The transistor formation layer 1050 includes at least one thin film transistor. An ELVDD voltage (a first power supply voltage) is applied to anode 1040 connected to one end of the thin film transistor according to a control of a data line, a gate line, other control lines, and the like.

An emission layer 1030 made of an organic emission material is formed on the anode 1040, and the first electrode plate 200 is laminated on the emission layer 1030 as the cathode. The ELVSS voltage is applied to the first electrode plate 200. Accordingly, the anode 1040, the emission layer 1030, and the first electrode plate 200 collectively configure an organic light emitting element.

In the exemplary embodiment of FIG. 1, the second sinusoidal wave signal is supplied to the first electrode plate 200, but when the ELVSS voltage is set to a predetermined voltage or less, pixel luminance is not influenced by the second sinusoidal wave signal. The pixel luminance is determined as a current amount flowing in the organic light emitting element, and the current amount depends on the voltage applied to a gate terminal of a driving transistor.

Accordingly, the organic light emitting element may generate constant pixel luminance regardless of application of the second sinusoidal wave signal.

A thin film encapsulation layer 1020 is laminated on the first electrode plate 200. The thin film encapsulation layer 1020 serves to prevent oxygen in air and moisture from permeating to the organic light emitting element. The structure of the thin film encapsulation layer 120 is not limited, but generally is an organic layer and an inorganic layer that are alternately laminated. The inorganic layer prevents oxygen and moisture from permeating, and the organic layer may be used for alleviating internal stress of the inorganic layer or filling a crack of the inorganic layer.

On the thin film encapsulation layer 1020, the first sensing electrode 12 is disposed and the second sensing electrode 23 is disposed by interposing a dielectric layer 1010 therebetween. In FIGS. 6A, 6B, 7A, and 7B, the first sensing electrode 12 and the second sensing electrode 23 are disposed on different layers, but may be disposed on the same layer by interposing the dielectric material. The layout of the sensing electrodes may be equally applied even in FIGS. 6B, 7A, and 7B below.

Although not illustrated, a circular polarizer and the like for preventing reflection of external light may be further included.

Figure 6B:
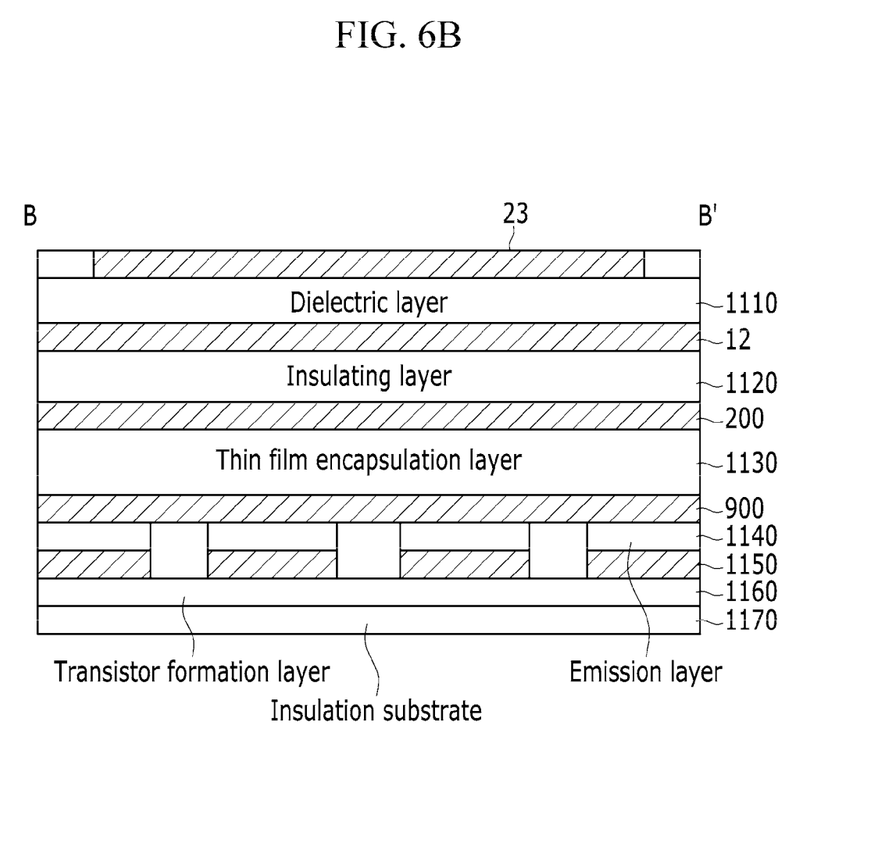

FIG. 6B is a cross-sectional view of FIG. 5 taken along line B-B' when the touch display device is the organic light emitting diode display.

Referring to FIG. 6B, in the touch display device, an insulation substrate 1170, a transistor formation layer 1160, an anode 1150, an emission layer 1140, a second electrode plate 900, a thin film encapsulation layer 1130, a first electrode plate 200, an insulating layer 1120, a first sensing electrode 12, a dielectric layer 1110, and a second sensing electrode 23 are sequentially laminated.

The touch display device of FIG. 6B is similar to that of FIG. 6A in the overall configuration and the function, but is different from the exemplary embodiment of FIG. 6A in that the second electrode plate 900 configures a cathode of the organic light emitting element, and only the second sinusoidal wave signal is applied to the first electrode plate 200.

In FIG. 6A, even though the second sinusoidal wave signal is applied to the cathode, there is no problem on the display, but according to the exemplary embodiment, since the display function and the parasitic capacitance removing function are separately operated, there is no problem on a display defect.

A new parasitic capacitance may be formed between the first electrode plate 200 and the second electrode plate 900, but since the amplitude of the second sinusoidal wave signal is much less than the voltage difference between the ELVDD voltage and the ELVSS voltage, the effect thereof is minimized.

Figure 7A:
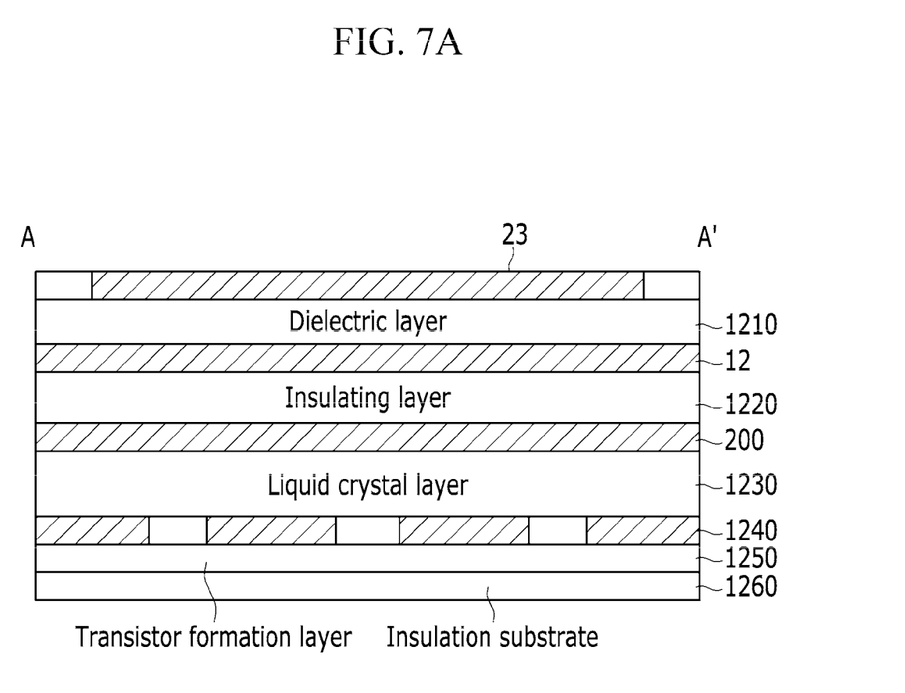
FIG. 7A and FIG. 7B are cross-sectional views illustrating an exemplary embodiment when the touch display device of the present invention is a liquid crystal display.

FIG. 7A is a cross-sectional view of FIG. 1 taken along line A-A' when the touch display device is a liquid crystal display.

An insulation substrate 1260 may be made of plastic such as glass or polyimide.

A transistor formation layer 1250 is disposed on the insulation substrate 1260. The transistor formation layer 1250 includes at least one thin film transistor. A display voltage Vpixel is applied to a pixel electrode 1240 connected to one end of the thin film transistor according to a control of a data line, a gate line, other control lines, and the like.

The first electrode plate 200 configures a common electrode of the liquid crystal display device and receives a common voltage Vcom.

In a liquid crystal layer 1230 disposed between the first electrode plate 200 and the pixel electrode 1240, arrangement of a liquid crystal is changed according to the formed electric field. According to the changed arrangement of the liquid crystal, an image is displayed to a user by selectively transmitting light of a backlight (not illustrated).

The common voltage Vcom and the second sinusoidal wave signal are simultaneously supplied to the first electrode plate 200. Since the second sinusoidal wave signal is a signal that is much smaller than a difference between the common voltage Vcom and the display voltage Vpixel and the high-frequency signal as described above, an effect of changing arrangement of liquid crystal molecules having a slow response speed is insignificant. Accordingly, display defects may be minimized.

On the first electrode plate 200, an insulating layer 1220 is laminated and a first sensing electrode 12, a dielectric layer 1210, and a second sensing electrode 23 are sequentially laminated.

Figure 7B:
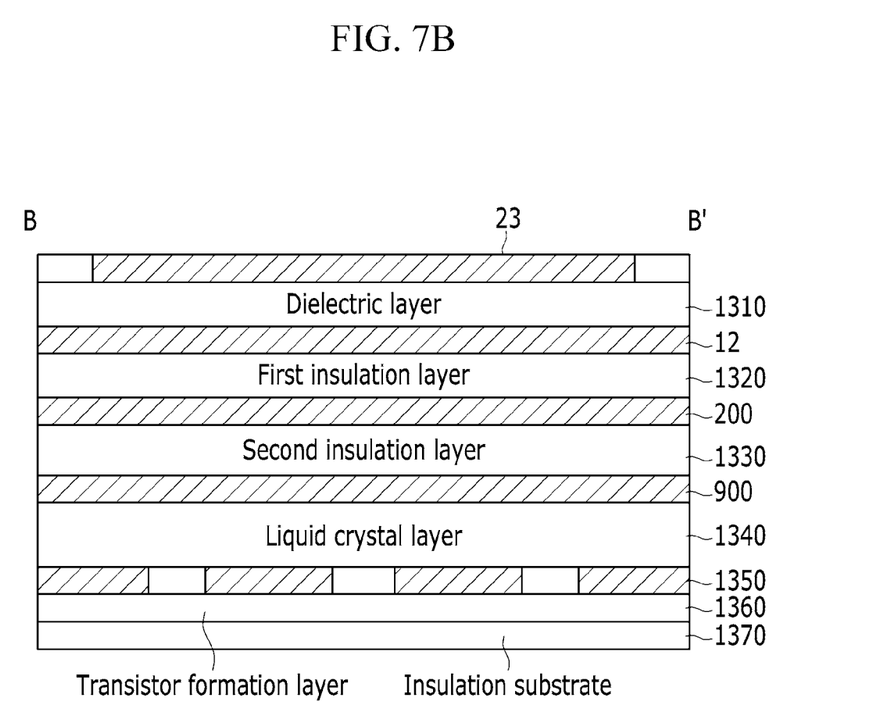

FIG. 7B is a cross-sectional view of FIG. 5 taken along line B-B' when the touch display device is the liquid crystal display.

Referring to FIG. 7B, in the touch display device, an insulation substrate 1370, a transistor formation layer 1360, a pixel electrode 1350, a liquid crystal layer 1340, a second electrode plate 900, a second insulating layer 1330, a first electrode plate 200, a first insulating layer 1320, a first sensing electrode 12, a dielectric layer 1310, and a second sensing electrode 23 are sequentially laminated.

The touch display device of FIG. 7B is similar to that of FIG. 7A in the overall configuration and the function, but is different from the exemplary embodiment of FIG. 7A in that the second electrode plate 900 configures a common electrode, and only the second sinusoidal wave signal is applied to the first electrode plate 200.

In FIG. 7A, even though the second sinusoidal wave signal is applied to the common electrode, it is described that there is no problem on the display, but according to the exemplary embodiment, since the display function and the parasitic capacitance removing function are separately operated, there is no problem on a display defect.

A new parasitic capacitance may be formed between the first electrode plate 200 and the second electrode plate 900, but since the amplitude of the second sinusoidal wave signal is minimal and the difference between the common voltage Vcom and the display voltage Vpixel is large, the effect thereof is minimized.

According to the exemplary embodiment of the present invention, it is possible to acquire a high signal-to-noise ratio and implement a thin touch display device by minimizing an effect of a parasitic capacitance and removing a noise component.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch display device, comprising:
a plurality of first sensing electrodes;
a plurality of second sensing electrodes forming a mutual capacitance with the first sensing electrodes;
an oscillation circuit connected with the plurality of second sensing electrodes and configured to supply energy so as to generate a first sinusoidal wave signal and a second sinusoidal wave signal corresponding to the first sinusoidal wave signal;
a first electrode plate forming a parasitic capacitance with the first and second sensing electrodes and configured to receive the second sinusoidal wave signal; and
a scanning driver configured to:
sequentially select the first sensing electrodes;
apply a reference voltage to the selected first sensing electrode; and
float the first sensing electrodes which are not selected.

2. A touch display device, comprising:
a plurality of first sensing electrodes;
a plurality of second sensing electrodes forming a mutual capacitance with the first sensing electrodes;
an oscillation circuit connected with the plurality of second sensing electrodes and configured to supply energy so as to generate a first sinusoidal wave signal;
a first electrode plate forming a parasitic capacitance with the first and second sensing electrodes and configured to receive a second sinusoidal wave signal corresponding to the first sinusoidal wave signal; and
a scanning driver configured to:
sequentially select the first sensing electrodes;
apply a reference voltage to the selected first sensing electrode; and
float the first sensing electrodes which are not selected,
wherein:
the first electrode plate comprises a cathode of an organic light emitting element; and
a common voltage is applied to the first electrode plate so as to overlap with the second sinusoidal wave signal.

3. The touch display device of claim 1, further comprising:
a frequency processor configured to receive the first sinusoidal wave signal including a touch frequency component according to a user's touch, and output a third sinusoidal wave signal by filtering a noise.

4. The touch display device of claim 3, wherein the frequency processor comprises:
a frequency mixer configured to receive the first sinusoidal wave signal and a carrier signal; and
a low pass filter configured to:
pass the first sinusoidal wave signal frequency down-converted by the frequency mixer; and
filter out a frequency up-converted noise component.

5. The touch display device of claim 3, further comprising a frequency-digital converter configured to receive the third sinusoidal wave signal and output a digital signal corresponding to the frequency of the third sinusoidal wave signal.

6. The touch display device of claim 3, wherein:
the third sinusoidal wave signal is defined as a reference frequency when there is no touch of the user;
when a difference between the frequency of the third sinusoidal wave signal and the reference frequency is greater than or equal to a first threshold value and less than a second threshold value, a hovering state is determined to exist; and
when the difference between the frequency of the third sinusoidal wave signal and the reference frequency is equal to or greater than the second threshold value, a touch state of the user is determined to exist.

7. The touch display device of claim 1, wherein a buffer is electrically interposed between the first electrode plate and the oscillation circuit.

8. The touch display device of claim 1, wherein:
the first electrode plate comprises a common electrode contacting one surface of a liquid crystal layer, and a common voltage is applied to the first electrode plate to overlap with the second sinusoidal wave signal.

9. The touch display device of claim 1, further comprising a second electrode plate disposed to interpose the first electrode plate between the first and second sensing electrodes,
wherein the second electrode plate comprises a cathode of the organic light emitting element or a common electrode contacting one surface of the liquid crystal layer.

10. The touch display device of claim 1, further comprising a switching unit electrically connected with the oscillation circuit by sequentially selecting the plurality of second sensing electrodes with respect to the selected first sensing electrode.

11. The touch display device of claim 1, wherein the oscillation circuit comprises:
an inductance element configured to exchange energy with the mutual capacitance; and
an energy supplying unit configured to supply the energy.

12. The touch display device of claim 11, wherein the oscillation circuit further comprises a negative resistance unit offsetting a parasitic resistance component of the second sensing electrode.

13. The touch display device of claim 1, wherein the reference voltage is a ground voltage.

14. A method for driving a touch display device, comprising:

selecting one of a plurality of first sensing electrodes and applying a reference voltage to the selected first sensing electrode by a scanning driver;
electrically connecting a second sensing electrode forming a mutual capacitance with the selected first sensing electrode and an oscillation circuit;
exchanging energy between an inductance element of the oscillation circuit and the mutual capacitance and generating a first sinusoidal wave signal determining a frequency according to whether a user's touch exists;
supplying a second sinusoidal wave signal corresponding to the first sinusoidal wave signal to a first electrode plate forming a parasitic capacitance with the first and second sensing electrodes; and
determining whether a touch state of the user exists by analyzing a frequency of the first sinusoidal wave signal.

15. The method of claim 14, further comprising:
mixing the first sinusoidal wave signal and a carrier signal; and
removing a noise by filtering the mixed first sinusoidal wave signal.

16. The method of claim 15, further comprising frequency-digital converting and outputting the filtered first sinusoidal wave signal.

* * * * *

UNITED STATES PATENT AND TRADEMARK OFFICE
CERTIFICATE OF CORRECTION

PATENT NO. : 9,727,192 B2  
APPLICATION NO. : 14/801465  
DATED : August 8, 2017  
INVENTOR(S) : Hyun-Sik Kim et al.

Page 1 of 1

It is certified that error appears in the above-identified patent and that said Letters Patent is hereby corrected as shown below:

On the Title Page

In item (73) the name of the Assignee including its city and country code "Seoul Viosys Co., Ltd., Ansan-si (KR)" should be properly listed as --Samsung Display Co., Ltd., Yongin-si (KR)--.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*